United States Patent [19]

Hill

[11] Patent Number: 5,678,594
[45] Date of Patent: Oct. 21, 1997

[54] VALUE FOR HIGH TEMPERATURE FLUIDS

[75] Inventor: John E. Hill, Phoenix, Ariz.

[73] Assignee: AlliedSignal Inc., Morris Township, N.J.

[21] Appl. No.: 531,881

[22] Filed: Sep. 20, 1995

[51] Int. Cl.[6] .................................................. F16K 49/00
[52] U.S. Cl. ...................... 137/338; 137/341; 251/305; 251/367; 251/214
[58] Field of Search ............................... 137/338, 340; 251/214, 305, 367, 309

[56] References Cited

U.S. PATENT DOCUMENTS

| | | | |
|---|---|---|---|
| 2,900,995 | 8/1959 | Dickerson et al. | 137/340 |
| 4,261,385 | 4/1981 | Worley | 137/340 |
| 4,353,388 | 10/1982 | Isoyama et al. | 137/340 |

Primary Examiner—A. Michael Chambers
Attorney, Agent, or Firm—Jerry J. Holden

[57] ABSTRACT

A butterfly valve for controlling the flow of high temperature fluids includes a valve body defining a flow path and having opposed portals. Cover plates are mounted over each of the portals and have a conical shaped wall extending inward to a bearing support member. A flow modulator is disposed between the cover plates and is mounted to the bearing support members by ceramic bearings. The modulator has a plate disposed in said flow path which is bounded by a leading edge, a trailing edge, and two disk flanges. Each of the disk flanges has a labyrinth seal in sealing engagement with an inner wall of said valve body. Nozzles are mounted to said cover plate to deliver cooling air flow to the bearings. A constant cooling flow rate is maintained by appropriately sized circumferential chambers adjacent each of the labyrinth seals.

11 Claims, 2 Drawing Sheets

VALUE FOR HIGH TEMPERATURE FLUIDS

TECHNICAL FIELD

The present invention relates generally to butterfly valves and in particular to a butterfly valve capable of controlling the flow of high temperature fluids.

BACKGROUND OF THE INVENTION

Referring to FIG. 1, a gas turbine engine 10 includes a compressor 12 that ingests and pressurizes ambient air. The compressed air flows to a combustor 14 where it is mixed with a fuel, such as natural gas, fossil fuels or wood chips, and ignited to form a hot gas. The hot gas is expanded across a turbine 16 which drives the compressor 12 through a shaft 18. The flow of hot gas from the combustor 14 to the turbine 16 is controlled by a valve 20 in response to a speed signal (dashed line), from the shaft 18. To increase engine speed, the valve 20 is closed and to reduce engine speed the valve 20 is opened to dump a portion of the hot gas overboard. Typically, the temperature of the hot gas exiting the combustor is about 1800° F. However, commercially available butterfly valves can only withstand gas temperatures on the order of 1000° F.

Accordingly, there is a need for a butterfly valve that can withstand gas temperatures in excess of 1000° F.

SUMMARY OF THE INVENTION

An object of the present invention is to provide a butterfly valve capable of withstanding gas temperatures over 1000° F.

The present invention achieves this objective by providing a butterfly valve comprising a valve body defining a flow path and having opposed portals. Cover plates are mounted over each of the portals. The cover plates each have a conical shaped wall extending inward to a bearing support member. A flow modulator is disposed between the cover plates and is mounted for rotation to the bearing support members by ceramic bearings. The modulator has a plate disposed in said flow path which is bounded by a leading edge, a trailing edge, and two disk flanges. Each of the disk flanges has a labyrinth seal in sealing engagement with an inner wall of said valve body. Nozzles are mounted to said cover plate to deliver cooling air flow to the bearings. A constant cooling flow rate is maintained by appropriately sized circumferential chambers adjacent each of the labyrinth seals. By cooling the bearings, the valve is able to withstand the temperatures that occur when a hot gas (over 1000° F.), is flowing across the modulator.

DESCRIPTION OF THE PREFERRED EMBODIMENT

Figure 2:
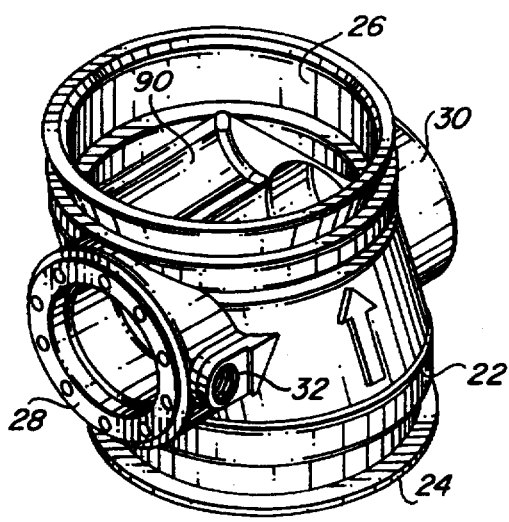
FIG. 2 is a perspective view of the valve body of a butterfly valve contemplated by the present invention.
Figure 1:
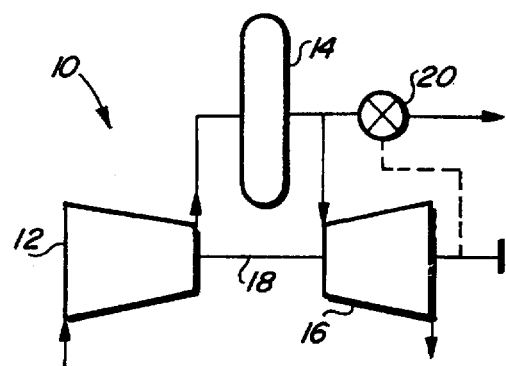
FIG. 1 is a schematic of a gas turbine engine.
Figure 4:
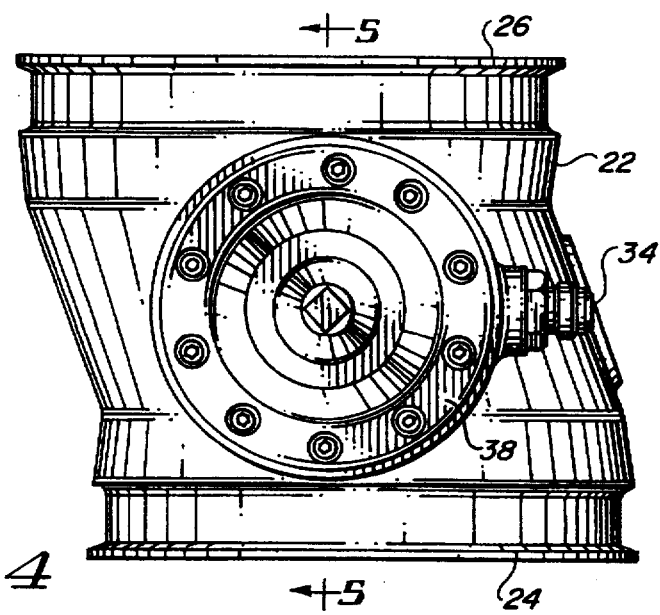
FIG. 4 is a side view of the valve body of FIG. 2.
Figure 5:
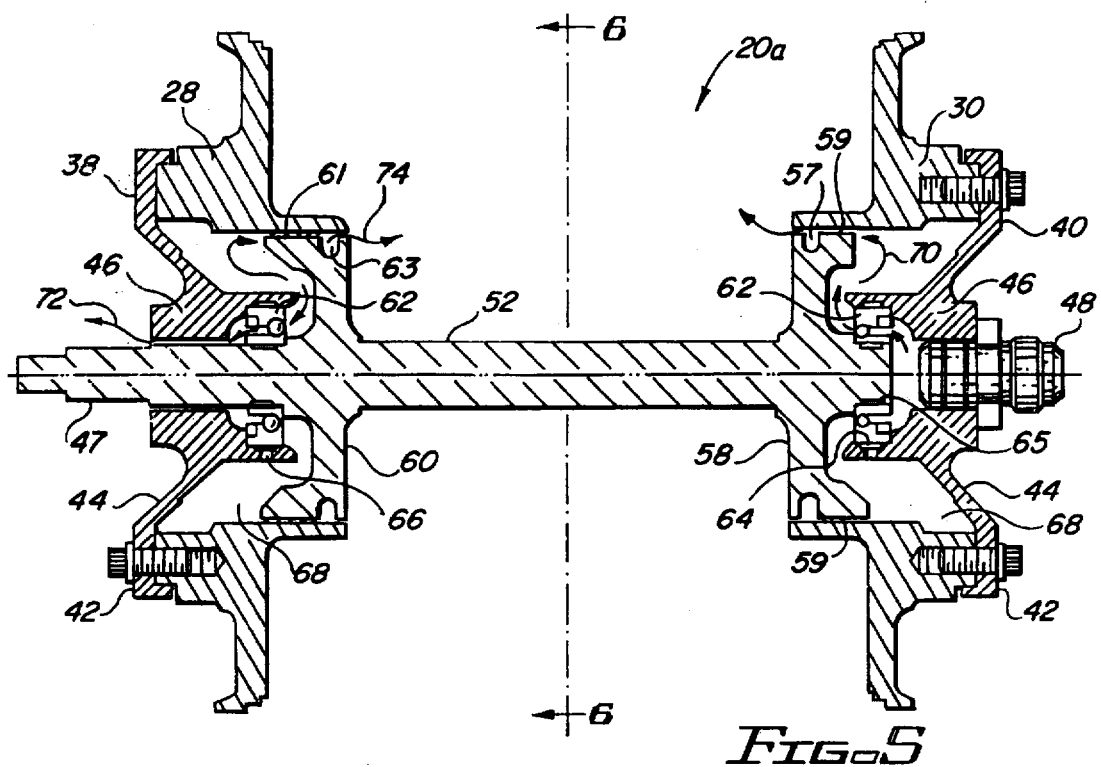
FIG. 5 is a cross-sectional view taken along line 5—5 of FIG. 4.

In the engine 10 the conventional butterfly valve 20 is replaced with a butterfly valve 20a that is described as follows. Referring to FIGS. 2, 4, and 5, the valve 20a includes a valve body 22 that defines a flow path extending from an inlet 24 and an exit 26. The valve body 22 is configured to be mounted in a duct and has two opposed circular portals 28, 30 which are sealed by annular cover plates 38, 40 respectively. The portal 28 has a hole 32 for receiving an air orifice or nozzle 34. Each of the cover plates 38, 40 has an outer flange 42 which is bolted to the valve body 22. From the outer flange 42, conical shaped annular walls 44 extends radially and axially inward to a bearing support 46. Because of their conical configuration. The walls 44 minimize stresses due to radial thermal gradients across the cover plates 38,40. A second air orifice or nozzle is mounted in the central hole of the cover plate 40.

Figure 3:
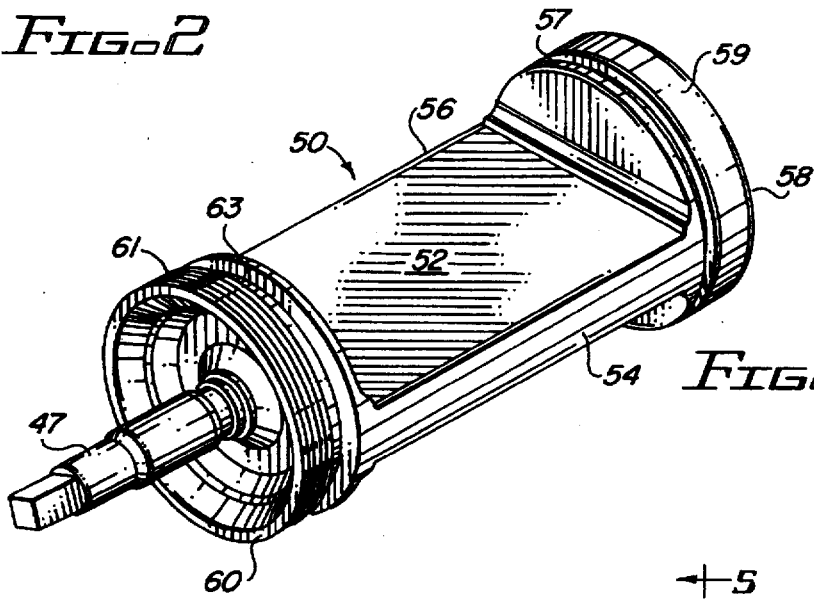
FIG. 3 is a perspective view of the flow modulator of the butterfly valve contemplated by the present invention.

Referring to FIGS. 3 and 5, the valve 20a also has a flow modulator 50. The flow modulator 50 includes a rectangular plate 52 that extends from a leading edge 54 to a trailing edge 56. Perpendicular to these edges, the plate 52 is bounded by disk flanges 58 and 60. Extending from the disk flange 60 is a shaft 67 which in a manner familiar to those skilled in the art can be connected to an actuator. Preferably, the plate 52, disks 58,60, and shaft 47 are made from a single casting of a nickel based superalloy. Alternatively, the modulator 50 can be made from a ceramic.

The modulator 50 is journaled for rotation to the valve body 22 by a pair of bearings 62. The bearings 62 are conventional having ceramic balls or rollers mounted between metal inner and outer races. Circumscribing the outer race of the bearings 62 are circumferential grooves 64 machined into the bearing supports 46. Likewise, circumferential grooves 65 are machined into the modulator 50 beneath the inner races of the bearings. The bearing supports 46 each have at least one hole 66 that place the grooves 64 in fluid communication with plenums 68.

The outer surface of the disk flange 58 has a flat labyrinth seal 59 for sealing with the inner surface of the portal 30. Similarly, the outer surface of the disk flange 60 has a multiple knife labyrinth seal 61 for sealing with the inner surface of the portal 28. Adjacent the seals 59, 61 are circumferential chambers 57,63 respectively.

In operation when hot gas is flowing across the plate 52, cooling air, which can be extracted from the compressor 12, is injected by the nozzles 34 and 48. Referring to FIG. 5, as represented by arrow 70 air from the nozzle 48 flows through the bearing 62 into the plenum 68, through the labyrinth seal 59 and then into the flow of hot gas. Air from the plenum 68 also flows through the holes 66 to cool the outer race of the bearing. Similarly, arrow 72 shows the flow of cooling air from the nozzle 34 which enters the plenum 68, flows through the bearing 62, and then out between the shaft 47 and bearing support 46. A portion of this cooling flow, represented by arrow 74 flows through the seal 61. Importantly, to maintain a constant flow rate of cooling air around the edges of the disk 53 and 60 as represented by arrows 70, 72, and 74, the circumferential chambers 57 and 63 must be sized to have an area four times larger than the effective areas of the seal 59 and 61 respectively.

Figure 6:
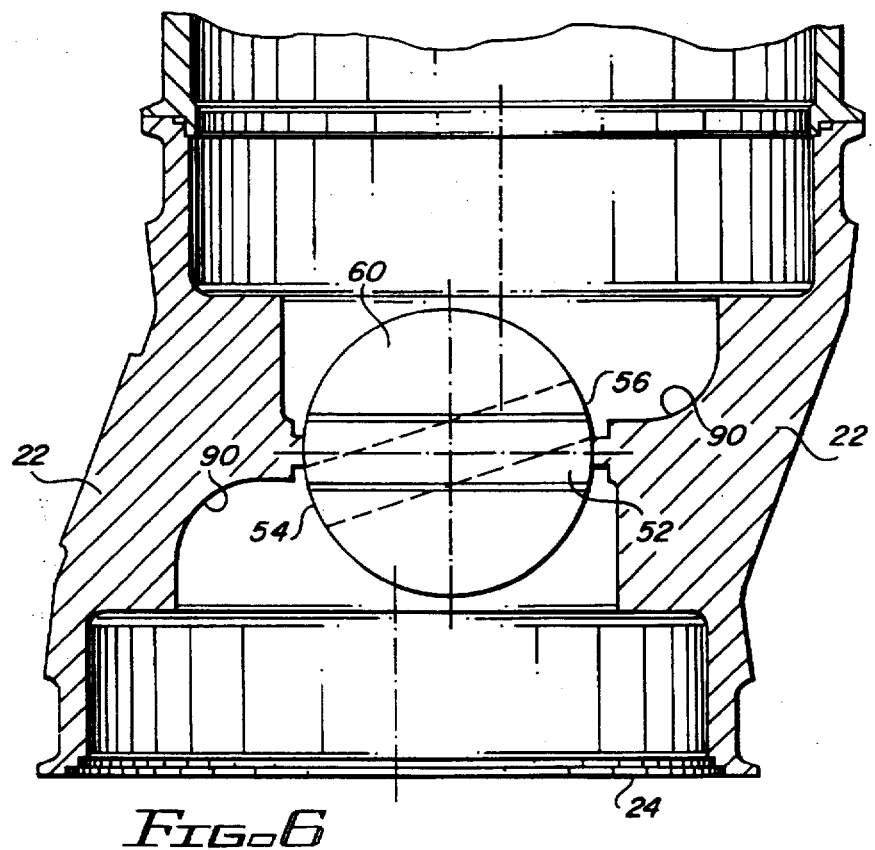
FIG. 6 is a cross-sectional view taken along line 6—6 of FIG. 5.

FIG. 6 shows the plate 52 in the closed position (solid lines), and in a partially opened position (dashed lines). Just upstream of the leading edge 54 and downstream of the trailing edge 56 the interior wall of the valve body 22 has curved portions 90. These curved portions 90 reduce the aerodynamic torque on the valve 20a and thus reduces the actuation load.

Various modifications and alterations to the above described preferred embodiment will be apparent to those skilled in the art. For example, the temperature capability of the valve can be increased by machining cooling air passages into the plate 52. Also thermal barrier coatings can be used on those portions of the valve exposed directly to the hot gas. Accordingly, this description of the invention should be considered exemplary and not as limiting the scope and spirit of the invention as set forth in the following claims.

What is claimed is:

1. A butterfly valve for controlling the flow of high temperature fluids comprising:

a valve body defining a flow path extending from an inlet to an outlet, and having opposed portals;

a cover plate for each of said portals, each of said cover plates attached to said valve body at its outer periphery and having a wall extending inward from said periphery to a bearing support member, said wall configured to minimize stresses due to radial thermal gradients;

a flow modulator disposed between said cover plates and having a plate disposed in said flow path, said plate is bounded by a leading edge, a trailing edge, and two disk flanges, each of said disk flanges having an outer surface in sealing engagement with an inner wall of said valve body, said flow modulator further having shaft portions extending from each of said flanges that are mounted to said bearing supports by a bearing; and means for delivering a flow of cooling air to said bearings.

2. The butterfly valve of claim 1 wherein said outer surfaces of said disk flanges have labyrinth seals.

3. The butterfly valve of claim 2 wherein said outer surfaces of said disk flanges have a circumferential chamber adjacent said labyrinth seals.

4. The butterfly valve of claim 3 wherein said circumferential chambers have an area at least four times larger than the effective areas of the labyrinth seal to which they are adjacent.

5. The butterfly valve of claim 1 wherein said bearings have a ceramic rolling elements disposed between metallic inner and outer races.

6. The butterfly valve of claim 5 wherein said bearing supports have at least one hole for directing cooling flow to said bearings.

7. The butterfly valve of claim 1 wherein said valve body has an interior wall with curved portions upstream of said leading edge and downstream of said trailing edge.

8. The butterfly valve of claim 1 wherein said cover plate walls have a conical shape.

9. The butterfly valve of claim 1 wherein said delivering means includes a flow nozzle.

10. The butterfly valve of claim 9 wherein at least one of said cover plates has a hole for receiving said flow nozzle.

11. The butterfly valve of claim 9 wherein at least one of said portals has a wall with a hole for receiving said flow nozzle.

* * * * *